(12) United States Patent
Charron et al.

(10) Patent No.: US 6,174,440 B1
(45) Date of Patent: Jan. 16, 2001

(54) DEVICE AND METHOD FOR PROCESSING A FLUID BY TWO-PHASE COMPRESSION AND FRACTIONATION

(75) Inventors: Yves Charron, Longpont sur Orge; Alexandre Rojey, Rueil-Malmaison, both of (FR)

(73) Assignee: Institut Francais Du Petrole, Cedex (FR)

(*) Notice: Under 35 U.S.C. 154(b), the term of this patent shall be extended for 0 days.

(21) Appl. No.: 09/195,706

(22) Filed: Nov. 19, 1998

(30) Foreign Application Priority Data

Nov. 19, 1997 (FR) .................................................. 97 14602

(51) Int. Cl.$^7$ .................................................. B01D 59/02
(52) U.S. Cl. .............................. 210/634; 95/16; 95/187; 95/228; 96/242; 96/244; 96/281; 210/101; 210/511; 418/5; 418/DIG. 1
(58) Field of Search ............................ 210/85, 96.1, 97, 210/143, 149, 175, 258, 259, 195.1, 511, 634, 739, 774, 805, 806, 194; 95/14, 15, 16, 235, 236, 1, 8, 13, 149; 96/244, 251, 253, 281, 282, 285, 243, 417

(56) References Cited

U.S. PATENT DOCUMENTS

| | | | |
|---|---|---|---|
| 3,191,854 | * 6/1965 | Lowler et al. | 418/5 |
| 3,499,270 | * 3/1970 | Paugh | 418/5 |
| 3,693,326 | * 9/1972 | Deane | 96/282 |
| 3,802,162 | * 4/1974 | Deane | 96/282 |
| 3,967,937 | * 7/1976 | Hobbs et al. | 95/13 |
| 4,132,535 | * 1/1979 | Rivers et al. | |
| 4,384,875 | * 5/1983 | Batteux et al. | 95/235 |
| 4,725,203 | 2/1988 | Arnaudeau | 417/167 |
| 4,948,394 | 8/1990 | Rojey . | |
| 5,735,936 | * 4/1998 | Minikkien et al. | 95/235 |
| 5,779,451 | * 7/1998 | Hatton | 418/9 |
| 5,782,958 | * 7/1998 | Rojey et al. | 95/235 |
| 5,797,981 | * 8/1998 | Collin et al. | 95/235 |
| 5,871,340 | * 2/1999 | Hatton | 418/9 |
| 5,907,924 | * 6/1999 | Collin et al. | 95/228 |

FOREIGN PATENT DOCUMENTS

| | | |
|---|---|---|
| 3339844 | * 11/1984 | (DE) . |
| 262170 | * 11/1988 | (DE) . |
| 249068 | * 12/1987 | (EP) . |
| 2534644 | 4/1984 | (FR) . |
| 2724200 | 3/1996 | (FR) . |
| 2424472 | 8/1996 | (FR) . |
| 2014862 | 9/1979 | (GB) . |

* cited by examiner

Primary Examiner—Joseph W. Drodge
(74) Attorney, Agent, or Firm—Antonelli, Terry, Stout & Kraus, LLP

(57) ABSTRACT

The invention is a device for processing a fluid F comprising at least one fraction A to be separated, the fraction to be separated being soluble in a solvent phase. The device includes at least one delivery for the fluid F to be processed; at least one delivery for the solvent phase; at least one two-phase compression device providing homogenization of the fluid F and the solvent phase which dissolves most of the fraction A in the solvent phase and produces a mixture of a solution F1 comprising of solvent phase S and the fraction A dissolved in the solvent phase, and of a fluid F1 which has been depleted of most of the fraction A; and a separation device coupled to an output of the at least one two-phase compression device which discharges respectively solution F1 comprising the solvent phase and the fraction A dissolved in the solvent phase and fluid F2.

37 Claims, 4 Drawing Sheets

DEVICE AND METHOD FOR PROCESSING A FLUID BY TWO-PHASE COMPRESSION AND FRACTIONATION

BACKGROUND OF THE INVENTION

1. Field of the Invention

The present invention relates to a device and to a method for processing a fluid comprising at least one fraction A to be separated by means of a two-phase compression device and a solvent phase which is selective towards the fraction to be separated.

2. Description of the Prior Art

It is well-known to process gases by contacting them with a solvent phase in absorption columns.

French Patents 2,605,241 and 2,616,087 describe processes for treating gases comprising acid gases and hydrocarbons by using physical solvents. These processes dehydrate these gases which separates the heavy hydrocarbons from the light ones and removes the acid gases from the hydrocarbons.

However, the methods described in the prior art have drawbacks, some of which are given hereafter:

during processing, part of the hydrocarbons can be co-absorbed in the solvent,
solvents are generally expensive products which are used in large amounts,
the processing units require many peripheral equipments which reduce the reliability of the system,
the contact columns are large in size,
they do not raise the pressure level of the fluids processed, for example in order to facilitate the transportation thereof or to increase the absorption power of the solvent.

SUMMARY OF THE INVENTION

The present invention consists in using a compression device allowing to mix and to dissolve the type A fraction(s) in a solvent phase while increasing the pressure level of the compressed fluids.

The invention is notably applied in cases where the fluid is a natural gas comprising acid gases to be removed, such as hydrogen sulfide $H_2S$ and/or carbon dioxide $CO_2$, the acid gases representing fraction A.

In the description hereafter, the term "solvent" or the expression "solvent phase" both designate the same product capable of collecting constituents to be separated from a fluid, and which can be a physical or a chemical solvent.

Similarly, the term "fluid" refers to liquids, gases or to a mixture of liquid and gas.

The present invention relates to a device for processing a fluid F comprising at least one fraction A to be separated, the fraction to be separated being at least soluble in a solvent phase. The device comprises at least one line for delivering the fluid F to be processed,
at least one line for delivering the solvent phase,
at least one two-phase compression device permitting the different phases of the fluid F and the solvent phase to homogenize so as to dissolve most of the fraction A in the solvent phase and to produce a mixture made up of a solution F1 consisting of the solvent phase and of the fraction A dissolved in the solvent phase, and of a fluid F2 depleted in at least most of fraction A,
at least one line for discharging the mixture,
a separation device provided with lines for discharging respectively solution F1 consisting of the solvent phase and of fraction A, and fluid F2.

The delivery line(s) can comprise compression and/or pumping devices and the discharge line can be fitted with a cooling device.

The device can comprise a means located upstream from the two-phase compression device, which "mixes" the fluid to be processed and the solvent phase prior to feeding it into a line.

The compression device comprises for example at least two sections, a first section providing a mixture Mi with a pressure level Pi and a second section providing, from mixture Mi, a mixture Ms with a pressure level Ps, a line for discharging mixture Mi and a line for feeding a fluid Mi into the second part, the two sections being separated by a seal and the hydraulics of the two sections being mounted "back to back" for minimizing axial thrust stresses.

The device according to the invention can comprise a fluid processing and/or mixing unit, the processing and/or mixing unit being connected to the compression device by fluid delivery and discharge lines.

A heat-exchanger is for example included in the processing unit.

When a heat-exchanger is provided, the latter comprises for example a circuit for heat-exchanging, separation and recycling at least part of the two-phase mixture withdrawn from the two-phase compression device.

The device can comprise means for determining parameters linked with the fluid and/or the operation of the compression device and data computing and processing means capable of changing the rotating speed of the two-phase compression device and/or acting on the efficiency of a refrigeration device and/or on the flow rate of the fluid recycled to the cooling circuit.

The present invention also relates to a method for separating at least one fraction or constituent A from a fluid F by using a solvent phase selective towards the fractions to be separated. The fluid F and solvent phase S are sent to a two-phase compression device under conditions which dissolve the fractions A to be separated in the solvent phase and provide a mixture of fluids made up of a solution F1 consisting of the fractions to be separated dissolved in the solvent and a fluid F2 freed from at least most of fraction A.

According to an embodiment of the method, solution F1 consisting of the solvent phase and of the dissolved fraction A can be separated from the rest of fluid F2 free from at least most of fraction A, and fluid F2 can be recycled at least partly upstream from the two-phase compression device.

The method can comprise at least one stage of withdrawal of at least part of the mixture of fluids after compression through a number of stages m of the twos phase compression device, a stage of processing the withdrawn part and a stage of feeding the processed withdrawn part back, after processing, to a stage of the compression device of a higher order than the order of the withdrawal stage m.

The fluid and/or a fluid such as part of the two-phase mixture withdrawn and/or part of the liquid phase extracted from the two-phase mixture withdrawn or at least part of the liquid coming from the two-phase compression device for example is treated and the treated fluid is recycled to the fluid extracted from the two-phase compression device.

The treatment maybe exchanging heat, refrigeration or heating.

The flow rate of the amount of solvent phase can be controlled as a function of the fraction A to be separated.

The solvent phase can be regenerated and recycled to the inlet of the two-phase compression device.

An aqueous phase is for example used as a liquid solvent phase.

According to another embodiment, the rotating speed of the compression device is for example controlled.

The device and the method can be advantageously used for processing a fluid comprising a physical solvent phase, acid gases and a minor fraction of hydrocarbons in order to recover the minor fraction of hydrocarbons.

BRIEF DESCRIPTION OF THE DRAWINGS

Other features and advantages of the invention will be clear from reading the description hereafter of embodiments of the device according to the invention, with reference to the accompanying figures wherein FIG. 1 diagrammatically shows the principle of the invention.

DETAILED DESCRIPTION OF THE INVENTION

Mixing and dissolving of the fraction to be separated according to the invention are performed in accordance with physical principles which are hereafter described.

Under equilibrium conditions the dissolution rate of a gas in a solvent varies with the pressure and the temperature. The dissolution ratio expressed in volume unit of gas per volume unit of liquid under standard pressure and temperature conditions increases in the general case, when the pressure increases and when the temperature decreases, for example for the dissolution of $CO_2$ in water. However, there are cases where the dissolution rate increases with the temperature, case for example of the dissolution of $H_2S$ in water at high pressure and low temperature.

Dissolution of a gas in a solvent does not occur instantaneously but progressively, considering the time of diffusion between the phases. The obtaining of equilibrium conditions can consequently be enhanced by increasing the surfaces of contact between the phases.

In the case of two-phase compression by means for example of a rotary type pump, obtaining of equilibrium conditions is facilitated by the formation of bubbles of very small size at the junction between the stationary parts and the rotating parts of the pump, where strong shear forces are exerted. The rotodynamic pump may include Helicol axial or helical radial axial impellers.

This obtaining of equilibrium is however slowed down by the coalescence of the bubbles which can appear at the level of the impellers and/or of the diffusers of the two-phase compression device. For substantially equal performances (manometric head and axial length), it will be advantageous to increase the number of compression cells (impellers and/or diffusers) and to decrease the axial length thereof, so as to increase the number of times the size of the bubbles can be reduced.

When the gas phase of the fluid consists of a soluble gas and of a non-soluble gas, the partial pressure of the gas should be taken into account to determine the conditions of dissolution of the gaseous fraction in the solvent.

Figure 1:
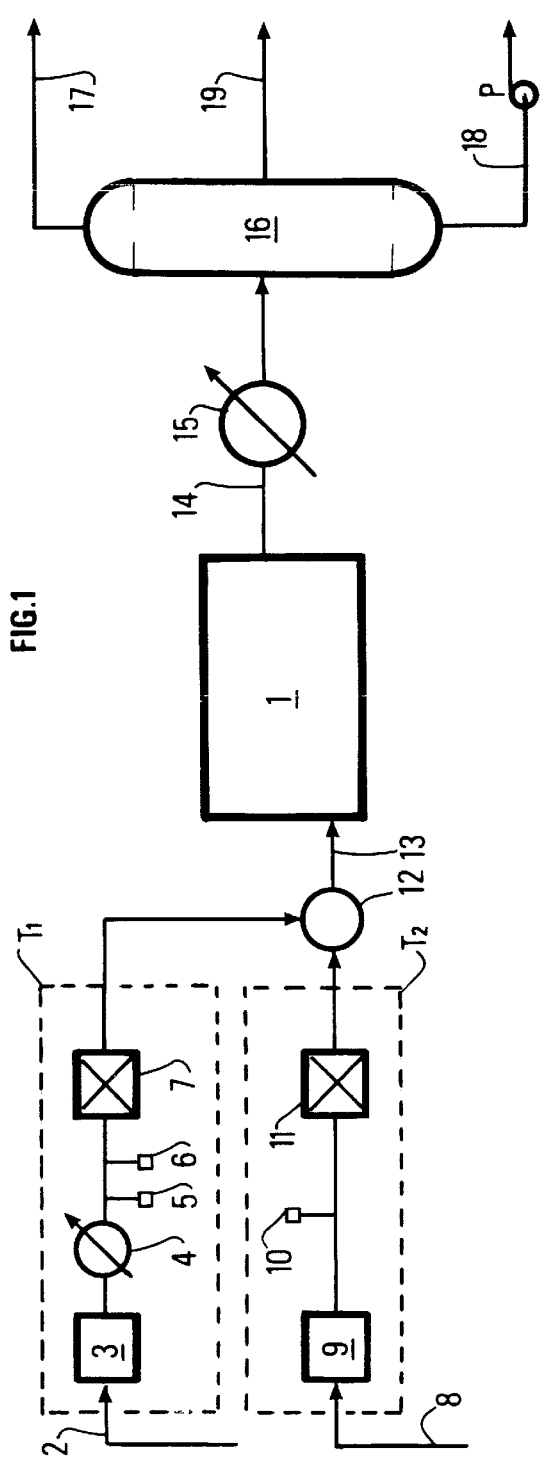

FIG. 1 diagrammatically illustrates a first embodiment of the device according to the invention applied for processing a gas comprising a hydrocarbon phase and acid gases such as carbon dioxide $CO_2$ and/or hydrogen sulfide $H_2S$, in order to separate them entirely or at least mostly from the hydrocarbon phase.

Figure 2:
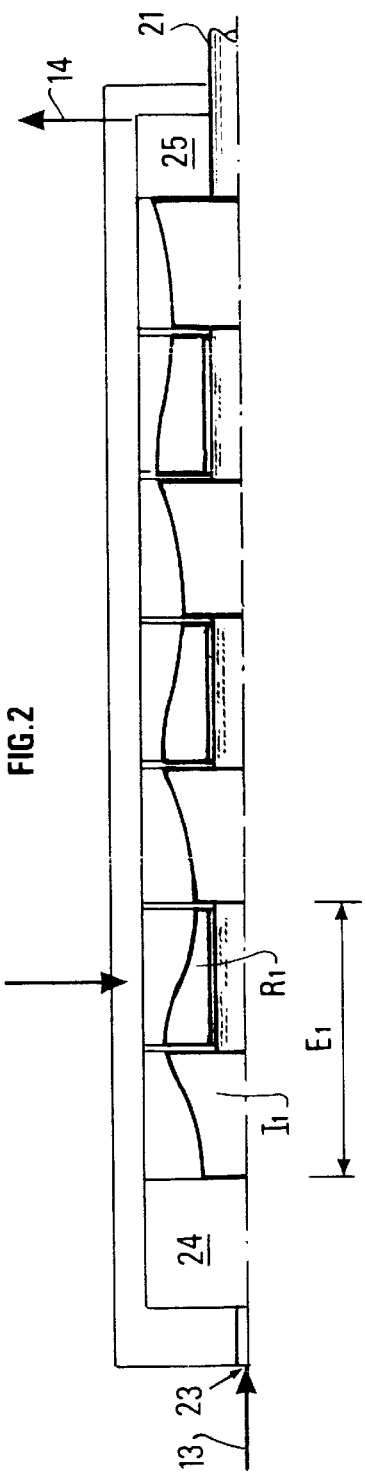
FIG. 2 shows details of the hydraulics of a two-phase compression device of FIG. 1, FIG. 3 diagrammatically shows another embodiment of the two-phase compression device of FIG. 1 comprising hydraulics mounted back to back, associated with an auxiliary processing unit, FIGS. 4A and 4B diagrammatically show two additional embodiments of the processing device of FIG. 3.

This implementation method uses at least one two-phase compression device 1, permitting the liquid and gas phase homogenization and comprising at least one compression stage E consisting of a helical-axial type impeller I followed by a diffuser R1 (FIG. 2). The hydraulics of the impellers and of the diffusers have specific characteristics as described in one of the Assignee's French Patents 2,333,139, FR-2, 471,501 or FR-2,665,224, whose technical disclosures are incorporated herein by reference. Two-phase compression device 1 is suited to dissolve the acid gases in a liquid phase selected accordingly and injected in the gas. FIG. 2 shows in detail an example of layout of a compression device used for implementation of the invention.

For technological reasons, the compression device can be made up of several compression or pumping machine bodies, each one of these bodies consisting of one or more sections and each section comprising one or more compression or pumping stages.

Without departing from the scope of the invention, the two-phase compression device could also be any compression device providing efficient mixing of the fraction to be separated and of the solvent phase, a screw pump for example.

A first line 2 delivers of the gas to be processed (fluid F and acid gas representing the fraction or fractions A to be separated). This line can be provided with a compressor 3, followed by a cooling means such as a heat exchanger 4, measuring means such as, for example, a temperature detector 5, a pressure detector 6 and a flowmeter 7, all these elements bearing reference number T1.

A second line delivers the solvent phase S, water for example. This line is provided with a single-phase pump 9, a pressure detector 10 and a flowmeter 11, all denoted by T2.

The compressed and cooled gas and the solvent phase from pump 9 are fed into two-phase compression device 1 by means of a device 12 and of a delivery line 13.

The gas is compressed in order to obtain a flow rate acceptable to the two-phase compression device, and the solvent phase is brought to a pressure substantially identical to that of the compressed gas in order to allow the introduction thereof in the same stage of the two-phase compression device, the inlet stage of the device for example.

Two-phase compression device 1 is provided with at least one discharge line 14 for the compressed fluid mixture mainly consisting of the hydrocarbons freed from all or at least most of the acid gases to be separated or fluid F2, and of a solution F1 consisting of solvent phase S and of the acid gases mostly dissolved in this solvent phase.

The extracted fluid mixture can possibly be cooled in an exchanger 15 placed on line 14 prior to being fed into a separation device 16. At the outlet of the separator, the gas phase mostly made up of hydrocarbons is discharged at the top through a line 17, and the solution comprising the solvent phase and the dissolved acid gases is discharged through a line 18 at the bottom of the separator.

This liquid phase can be transferred by a pump P to a processing unit or to a storage tank.

Various measuring devices can be placed at the outlet of the two-phase compression device and of the separator, such as pressure, temperature and flow rate detectors, and on the device itself, such as a device for measuring the rotating speed of the compression device. These devices are not shown in this figure for simplification reasons.

The various measuring devices are for example connected to a microcontroller whose purpose is to control the flow rates of the various fluids and/or to control the rotating speed of the two-phase compression device so as to obtain a maximum rate of dissolution of the acid gases in the solvent phase.

The amount of solvent phase injected can thus be measured and controlled for example as a function of the acid gas content and/or of the hydrocarbon phase contained in the gas.

The nature of the solvent liquid phase is selected according to the characteristics of the acid gases present in the fluid to be processed, so as to obtain practically total absorption of these gases while preventing the hydrocarbons contained in the gas to be processed. It is thus possible to take into account various parameters such as the molar fraction and the solubility of each of the components, as well as the pressure and the temperature of the fluid to be processed.

Separation device 16 can be a static type device, separation between the hydrocarbons and the solvent-acid gas solution being obtained through a sufficient residence time in a horizontal or vertical enclosure. The enclosure can be provided internally with plates or packings so as to facilitate separation and to prevent the (solvent) liquid droplets from being entrained in the gaseous hydrocarbon phase. More specifically, it is possible to place a liquid separator type drum upstream from the gas discharge line.

This device can also be a dynamic type device, separation being then facilitated by a centrifugation effect. In this case, the compression device and the separation device can be driven by a common shaft.

The function of device 12 is notably to gather the acid gases and the solvent phase which are at a substantially identical pressure level in order to introduce them together in the inlet stage of the compression device for example.

When liquid hydrocarbons can form at the outlet of the two-phase compression device and of the heat exchanger 15, separation device 16 can comprise a line 19 for discharging a liquid hydrocarbon phase which can be present at the inlet of the compression device or which may have formed under the effect of the pressure increase in the two-phase compression device and by exchanging heat through the heat exchanger.

For fluids comprising at least one gas phase and at least one liquid phase, it is possible to provide a phase separation upstream from assemblies T1 and T2, and a device for feeding the gas phase to line 2 and the liquid phase to solvent phase delivery line S.

Implementation of the method is explained in connection with the diagram of a compression device example given in FIG. 2, which comprises 4 compression stages E1 to E4 arranged in series in a housing 20. The solvent phase used for collecting the acid gases is for example water.

Each stage Ei of the system comprises a helical-axial impeller Ii secured to a rotation shaft 21, followed by a diffuser Ri, i designating the order of the two-phase pumping stage.

The two-phase compression device comprises at least one opening 23 communicating with fluid mixture delivery line 13 and an inlet stage 24 placed upstream from first impeller E1.

At the level of the outlet thereof, the two-phase compression device can comprise an adapter part such as a volute 25 placed after the impeller of the last stage, which converts the kinetic energy into potential energy in order to minimize energy losses at the outlet, volute 25 being connected to discharge line 14.

At the outlet of first impeller I1, the mixture of fluids has a pressure level P1. This mixture comprises two phases, one in the form of a solution of acid gases in water, the other consisting mostly of the hydrocarbons and of the fraction of acid gases that is not dissolved yet.

Dissolution of the acid gases in the water and mixing of these two phases take place as explained above, as a result or the two-phase compression and under the effect of the shear forces existing between the moving parts and the stationary parts of the two-phase compression device.

While passing through the pumping stages of higher rank i, mixture M1 continues acquiring energy until a given pressure level Ps sufficient to allow dissolution of the acid gases in the water and transportation of the separated hydrocarbons is obtained.

The mixture extracted through discharge line 14, passes through the heat exchanger 15 and is separated in separation device 16 into a gaseous hydrocarbon phase practically free from acid gases, extracted through line 17, and a water-acid gas solution discharged at the bottom of the separator through line 18 (FIG. 2).

Figure 3:
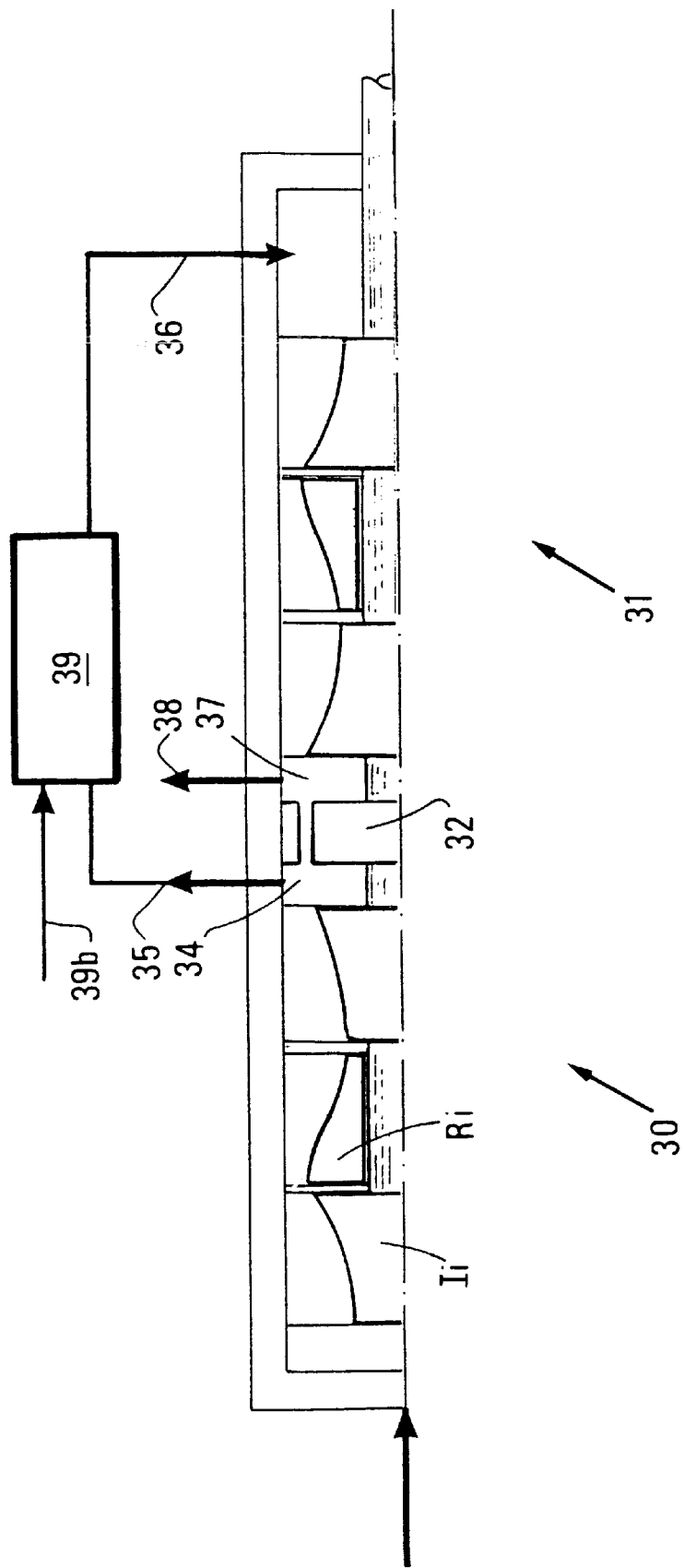

FIG. 3 shows two embodiment of the device according to the invention which can be used separately or together, representing respectively a particular "back to back" (high pressure discharges of each stage being adjacent) mounting of the hydraulics, advantageous for applications using high pressures, and use of a processing device in series.

The two-phase compression device consists of two sections 30, 31 for which the compression stages are mounted "back to back", the two sections being separated by a sealing device 32, a labyrinth seal for example. The mixture circulates in section 30 in the opposite direction to that of section 31.

According to this embodiment, section 30 comprises several compression stages Ei(Ii, Ri) followed by a volute 34. The mixture of fluids consisting of the gas comprising the acid gases and water is sent to first section 30 where it is brought to an intermediate pressure level Pi and where the acid gases dissolve at least partly in the water. The new mixture of fluids thus obtained Mi is discharged through a line 35 situated downstream from volute 34.

Between two sections, it is possible to have different known devices, for example:
a mixing device such as a stacked packing element acting as a static mixer,
a cooling device, by heat exchange,
a separation device, by using a static or dynamic separator.

In the non limitative example given in this figure, mixture Mi flows through a processing device 39 prior to being sent to the second section of the compression device through a line 36. Processing device examples are shown in detail in FIGS. 4A and 4B.

The mixture Mi is compressed through the compression stages of second section 31 prior to being discharged through volute 37 and line 38 corresponding to the high-pressure outlet of the compression device. While passing through the second section of the compression device, the pressure level of mixture Mi is raised to a pressure Ps sufficient to obtain practically total dissolution of the acid gases in the water.

The fluid mixture made up of the water-dissolved acid gas solution and the hydrocarbon gas phase depleted in acid gases is extracted through line 38 prior to possibly being cooled and separated according to the same pattern as that shown in FIG. 1 after passing through a heat exchanger similar to 15 and a separator 16 (FIG. 1).

The "back to back" mounting of such a layout notably has the advantage of minimizing axial thrust stresses in case of high-pressure applications.

Processing device 39 arranged in series allows various types of operations to be performed, some of which are described below by way of non limitative example in connection with FIGS. 4A and 4B.

Mixture Mi coming from the medium-pressure or intermediate-pressure outlet is sent through a line 35 to processing unit 39. Downstream from processing unit 39, mixture Mi is then sent through line 36 to the medium-pressure inlet of the second section 31 of the compression device.

By the mere fact of the flow of the two-phase mixture and of the residence time in lines 35, 36, and in processing unit 39, it is possible to come close to the dissolution conditions defined under equilibrium conditions. As a consequence, the diameters and the lengths of the pipes situated on either side of processing unit 39 can be calculated so as to adjust this residence time.

The residence times to be observed will possibly be defined from preliminary tests performed under real operating conditions. It will thus be possible to predict dissolution differences between transient conditions and at equilibrium, and these differences can be expressed in time lengths or in flow of gas.

Processing unit 39 can comprise a refrigeration system, not shown for clarity reasons in the figure, which can be included in the unit. The heat exchanger will enhance the gas dissolution in the liquid and therefore:

it will facilitate achieving of equilibrium conditions considering the residence time in the refrigeration system, it will increase the density of the mixture, a parameter favoring compression of a two-phase mixture, it will reduce the ratio of the volume flow rates of the gas and of the liquid, a parameter which also favors compression of a two-phase mixture.

The heat-exchanger may provide cooling or heating.

For instance, to increase the dissolution of $CO_2$ in water, cooling will be required.

In the case of the dissolution of $H_2S$ at high pressure, cooling will be required a high temperature while heating will be required at low temperature.

The processing/cooling unit can be designed to cool the two-phase mixture and/or part of the liquid phase withdrawn from this mixture. FIGS. 4A and 4B diagrammatically show two embodiments of the processing device comprising means for withdrawing and for recycling the liquid.

Figure 4A:
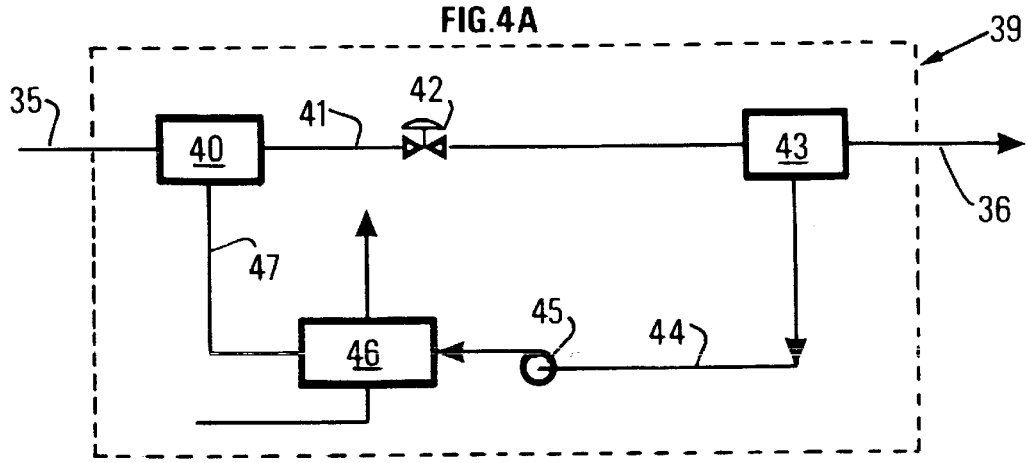

In FIG. 4A, processing unit 39 comprises a static or dynamic type mixer 40 placed in line 41, a pressure drop control valve 42, a means 43 for extracting at least part of the liquid phase contained in the two-phase mixture circulating in line 41, a line 44 and a pump 45 for sending the liquid fraction extracted to a cooling device such as an exchanger 46 at the outlet of which the cooled liquid fraction is recycled through a line 47 to static mixer 40 in order to be mixed with the fluid circulating in line 41.

When the fluid is in the form of a stratified flow in line 41, extraction means 43 are selected to withdraw at least part of the liquid phase at a lower point of the line.

For fluids with an annular flow, extraction means 43 will extract a fraction of the liquid phase on the periphery of line 41.

Pump 45 can be a single-phase pump with a low manometric head.

Figure 4B:
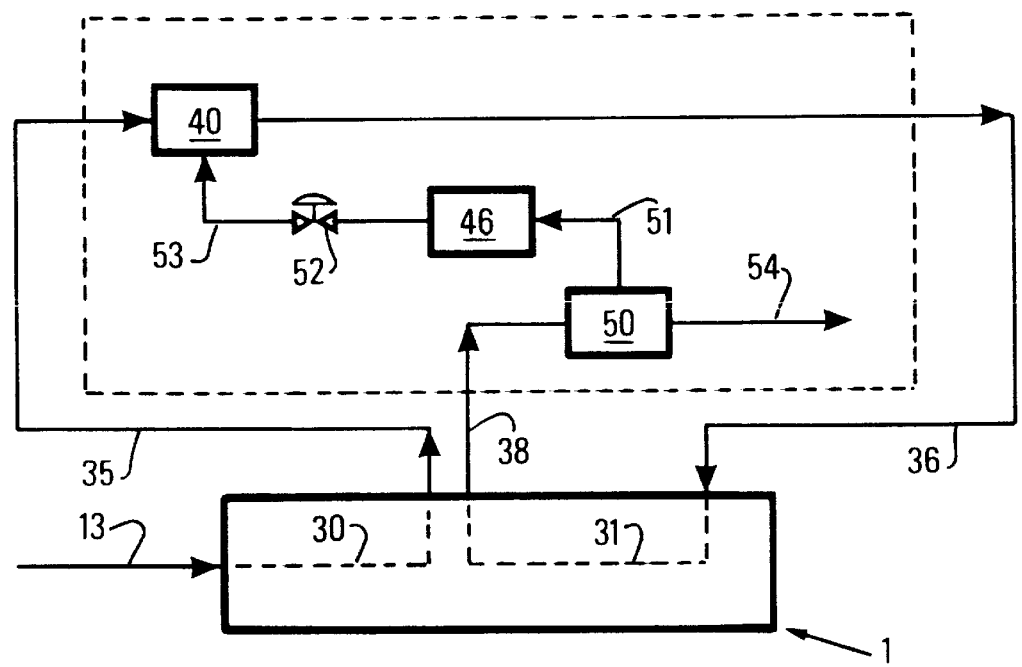

FIG. 4B diagrammatically shows another embodiment variant where withdrawal of all or part of the fluid to be cooled is performed at a high pressure at the outlet of the two-phase compression device.

The processing unit comprises the static or dynamic mixer 40 situated on line 41, means 50 for extracting a fraction of the fluid coming from the compression device, which are connected to heat exchanger 46 by a line 51, a valve 52 allowing the flow rate of the liquid cooled in heat exchanger 46 to be controlled, the cooled liquid being sent through a line 53 to static mixer 40.

The part of the fluid that has not been withdrawn and corresponding substantially to the flow of fluid circulating in line 13 is discharged through a line 54.

Recirculation of the cooled liquid to mixer 40 is allowed under normal operating conditions without the aid of an additional pump on account of the positive pressure difference between line 38 and line 35.

Such layouts (FIGS. 4A and 4B) will notably allow:

higher efficiency and volume reduction of the exchanger operating at a high or moderately high pressure, liquid flow rate increase in the recycle zone, favoring dissolution of the gas in the liquid.

Processing unit 39 can be equipped with other lines 39b (FIG. 3) allowing a fluid to be added to mixture Mi, for example the aforementioned additives.

Figure 5:
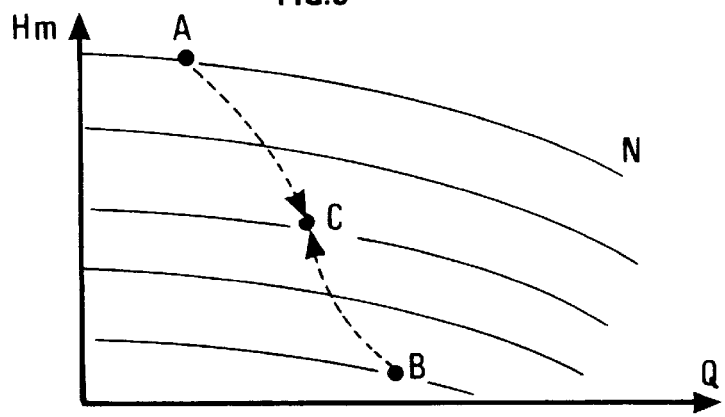
FIG. 5 shows a possible compression device control pattern.

FIG. 5 diagrammatically shows, by means of a manometric head (ordinate)-outlet volume (abscissa) diagram, the hydraulic performances of the two-phase compression device for various velocities (N). This diagram shows a wanted working point C and two points A and B representing two dysfunctioning instances.

When the two-phase compression device is equipped with a suitable measuring system comprising, for example, pressure, temperature, flow rate, density (or void fraction) detectors and a control and computing device such as a microcontroller connected to all these elements, it is possible:

to measure various parameters the flow rate values of the gas phase and of the liquid phase before they enter the two-phase compression device Qg and Ql, and to measure for each one of them the associated temperature and pressure values Tg and Tl, Pg and Pl, at the outlet of the compression device, values linked with the mixture of fluids, such as the pressure Pm, the temperature Tm, the flow rate Qm and the density $\rho m$ thereof, to store the characteristic parameters of the gaseous and liquid fluids at the inlet of the compression device, for example the density for the liquid fluid, $\rho l$, and the molar mass Mg and the isentropic factor $\gamma g$ for the gaseous fluid, from these various measurements, from the aforementioned data and from suitable data processing, to determine the working point of the compression device and the corresponding velocity curve, and by comparison with a determined value, to check whether this working point belongs to an allowed operating range or to an optimum operating range.

If the working point is outside the desired operating range, it will be possible to act on the rotating speed if the device has a variable-speed drive, and possibly on the efficiency of the refrigeration system or on the flow rate of the recycled liquid according to the design of the compression device.

For example, if point A represents too fast a dissolution with a flow rate that is too low downstream and a pressure that is too high downstream, to overcome this problem it will be possible to intervene by reducing the rotating speed of the two-phase compression device in order to bring working point A to the desired working point C.

Working point B schematizes the opposite case.

The compression device will preferably be equipped with a variable-speed drive. Speed control can be performed automatically or manually.

Figure 6:
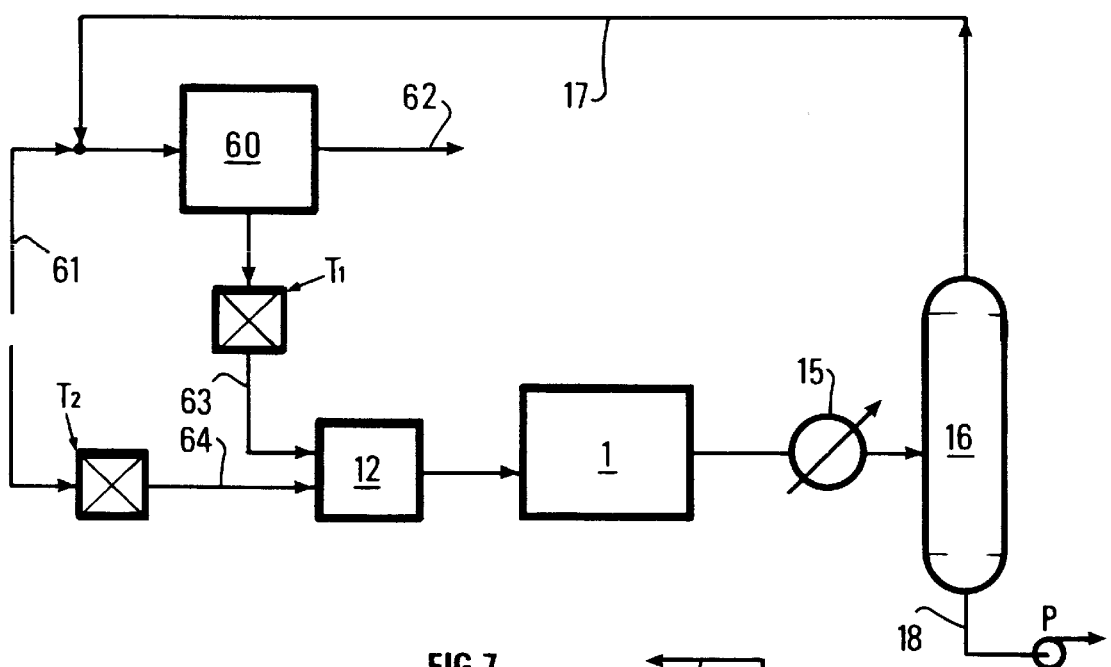
FIG. 6 shows the application of the device of FIG. 1 after a processing unit, FIG. 7 diagrammatically shows another embodiment where the solvent is recycled.

FIG. 6 diagrammatically shows an example of application of the two-phase compression device described above, placed downstream from a processing unit 60 such as that described in the Assignee's French Patents 2,605,241 and 2,616,087, whose technical disclosure is incorporated herein by reference. At the outlet of the physical solvent or chemical solvent processing units, the acid gases have a pressure generally ranging between 0.5 and 1.5 MPa and a temperature ranging between −30° C. and −10° C.

Some reference numbers already mentioned in the previous figures designate some of the aforementioned elements or devices.

Processing unit 60 is provided with a line 61 allowing introduction of the gas to be processed containing a high acid gas load, a line 62 for discharging the processed gas containing only a very small amount of acid gases and a line 63 for extracting a fluid comprising acid gases in a high concentration used during processing and hydrocarbons in a lower concentration co-absorbed by the solvent.

Delivery line 63 can be connected to two-phase compression device 1 substantially identical to that of FIG. 1.

The water used as solvent is introduced into device 1 through a line 64 after passing for example through assembly T2 (FIG. 1).

Inside the two-phase compression device, the acid gases dissolve in the water. The fluid consisting of the hydrocarbons and of the solution of acid gases dissolved in water is separated according to a pattern identical to that described in FIG. 1, which gives hydrocarbons discharged through line 17 and recycled to delivery line 61.

Such a procedure advantageously optimizes the ratio of hydrocarbon recovery.

Figure 7:
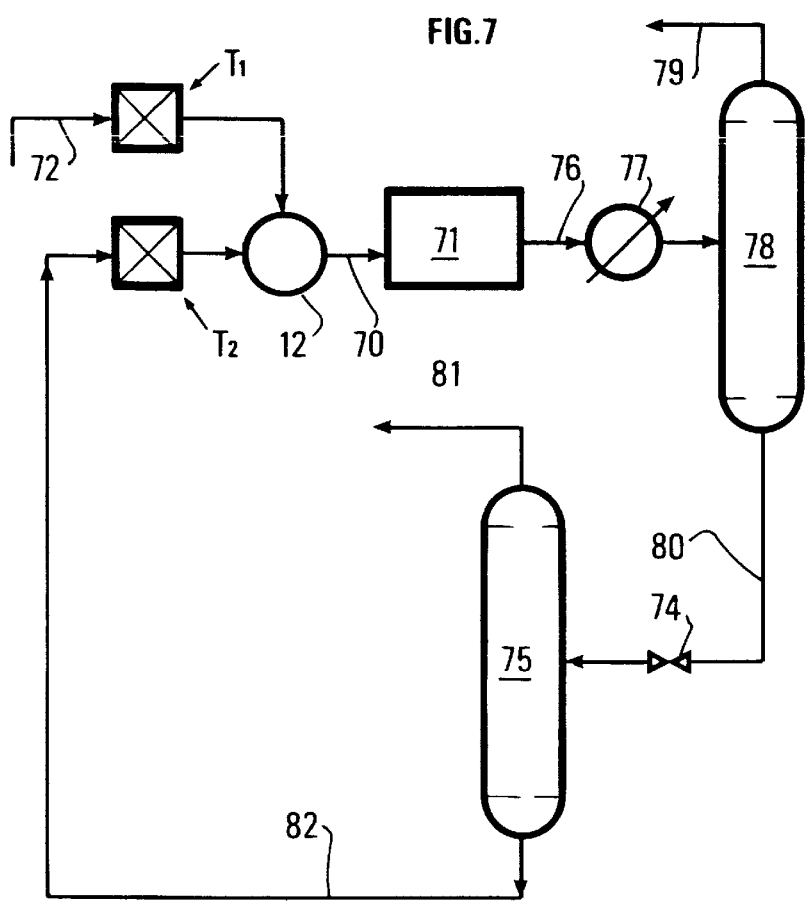

FIG. 7 diagrammatically shows an embodiment where the solvent phase is recycled, which is advantageous when the solvents used are polluting and/or expensive.

An assembly comprising the following elements are arranged downstream from the device described in FIG. 1:

a compression device 71 with characteristics substantially identical to those of the two-phase compression device 1 of FIG. 1, a line 72 for feeding a fluid to be processed into two-phase compression device 71 and a line 82 for delivering a regenerated solvent phase, for example a physical solvent capable of collecting the acid gases contained in the fluid to be processed. The regenerated solvent phase comes from a regeneration circuit comprising an expansion valve 74 and a separating drum 75. The fluid and the solvent phase are mixed by device 12, the mixture being fed through a line 70 into the two-phase compression device, a line 76 for discharging a fluid comprising the non soluble fraction of the gases and a solution consisting of the solvent phase in which the acid gases have been dissolved according to a principle similar to that described in connection with FIG. 2 and of a fraction of hydrocarbons which has been co-absorbed, a heat exchanger 77, a separation device 78 at the outlet of which a gas phase mostly made up of hydrocarbons is discharged at the top through a line 79, whereas the fluid mixture consisting of the solvent phase, the dissolved acid gases and the hydrocarbons in small amount is discharged at the bottom of the separator through a line 80, the solvent phase regenerating circuit comprising, as mentioned above, valve 74 and separator 75. At the bottom of separator 75, the regenerated solvent phase is extracted through a line 82 and recycled to the inlet of two-phase compression device 71. At the top, a gas phase rich in acid gases is discharged through a line 81.

This gas phase can be sent to be processed according to the same pattern as that given in FIG. 2, or to another processing unit.

Without departing from the scope of the invention, the patterns described in connection with FIGS. 1 and 2 are applied for compressing and processing a natural gas prior to sending it to an export pipe.

When the volume flow rate of the gas is high, the gas can be compressed by compressor 3 (FIG. 1). In two-phase compression device 1, it is contacted with an aqueous phase. At the outlet thereof, a gas phase consisting of the natural gas at least partly freed from the acid gases, with a pressure level equal to the transport pressure, and an aqueous phase containing the removed and dissolved acid gases are obtained.

The natural gas is sent to the export pipe whereas the aqueous phase comprising the acid gases is pumped, for example in order to be reinjected into an aquifer or a storage tank.

The invention is applied for processing and compression of a natural gas, a refinery gas, or a synthesis gas.

Fraction A to be separated from the fluids can consist of acid gases such as $H_2S$ or $CO_2$.

The solvent phase can be a salted aqueous phase and it can consist of formation water to which a chemical solvent such as an amine has been added.

It is also possible to use a physical solvent such as an alcohol or an ether.

The fluid to be processed can also be a gas rich in hydrogen or nitrogen, fraction A to be separated being a hydrocarbon fraction, and the solvent consisting of a liquid hydrocarbon fraction such as, for example, a gasoline type petroleum cut.

The nature of the solvent phase will be selected according to the fraction a to be separated and/or to that of the processed gas.

What is claimed is:

1. A device for processing a fluid F comprising at least one fraction A to be separated, the fraction to be separated being soluble in a solvent phase, comprising:

at least one delivery line for the fluid F to be processed;

at least one delivery line for the solvent phase for coupling to a source of solvent;

at least one two-phase compression device, in fluid communication with the at least one fluid delivery line and at least one solvent phase delivery line and having at least one output, and operable to provide homogenization of the fluid F and the solvent phase which dissolves most of the fraction A in the solvent phase and produces a mixture of a solution F1 comprising solvent phase S and the fraction A dissolved in the solvent phases and of a fluid F2 which has been depleted of most of the fraction A; and a separation device coupled to an output of the at least one two-phase compression device which discharges respectively solution F1 comprising the solvent phase and the fraction A dissolved in the solvent phase and fluid F2; and wherein the at least one two-phase compression device comprises at least one rotodynamic pump.

2. A device as claimed in claim 1, further comprising a discharge line from the separation device having a covering device and wherein at least one of the delivery lines has a compressor and/or pump.

3. A device as claimed in claim 1, further comprising a mixer located upstream from the at least one two-phase compression device, which mixes the fluid F and the solvent phase prior to introduction into the at least one two-phase compression device.

4. A device as claimed in claim 1, wherein:

the at least one compression device comprises at least two sections, a first section providing a mixture Mi with a pressure level Pi and a second section providing, from mixture Mi, a mixture Ms with a pressure level Ps, a line for discharging mixture Mi and a line for feeding the mixture Mi into the second section, the sections being separated by a sealing device and the first section providing mixture Mi being adjacent to a fluid output of the second section providing mixture Ms.

5. A device as claimed in claim 4, further comprising:
a fluid processing unit.

6. A device as claimed in claim 5, further comprising:
a heat-exchange within the processing unit.

7. A device as claimed in claim 6, further comprising:
a circuit which provides heat exchange, separation and recycling of at least part of a two-phase mixture withdrawn from the at least one two-phase compression device.

8. A device as claimed in claim 4, further comprising:
a mixing unit.

9. A device as claimed in claim 1, further comprising:
means for determining parameters linked with the fluid and/or operation of the at least one two-phase compression device, a processor which changes at least one of rotating speed of the at least one two-phase compression device, efficiency of a cooling device or a flow rate of fluid recycled to the cooling device.

10. A method for separating at least one fraction A from a fluid F by using a solvent phase which is selective of the at least one fraction to be separated, comprising:

feeding the fluid F and the solvent phase into at least one two-phase compression device comprising at least one rotodynamic pump, dissolving the at least one fraction A in fluid F into a solvent phase S with the rotodynamic pump providing homogenization of the fluid F and the solvent phases by compression within the two phase compression device and obtaining a mixture of fluids made up of a solution F1 comprising the at least one fraction A dissolved in the solvent phase and a solvent phase S and of a fluid F2 which has been depleted of most of fraction A.

11. A method as claimed in claim 10, wherein:
the solution F1 is separated from fluid F2 and the fluid F2 is recycled to the two-phase compression device.

12. A method as claimed in claim 11, wherein:
a flow rate of the solvent phase S is controlled as a function of the at least one fraction A to be separated.

13. A method as claimed in claim 12 wherein:
an aqueous phase is used as the solvent phase S.

14. A method as claimed in claim 12, wherein:
one of a rotating speed of the at least one two-phase compression device is controlled and/or an efficiency of a cooling device in the at least one two-phase compression device is controlled.

15. A method as claimed in claim 11 wherein:
the solvent phase is regenerated and recycled to an inlet of the at least one two-phase compression device.

16. A method as claimed in claim 11 wherein:
an aqueous phase is used as the solvent phase S.

17. A method as claimed in claim 11, wherein:
one of a rotating speed of the at least one two-phase compression device is controlled and/or an efficiency of a cooling device in the at least one two-phase compression device is controlled.

18. A method as claimed in claim 10, wherein:

the two-phase compression device comprises at least two sections in which at least part of a mixture of the fluid and the solvent phase is withdrawn after compression in one section which comprises a processing part to obtain a mixture of compressed fluids and a second section which compresses the mixture of fluids compressed by the first section.

19. A method as claimed in claim 18, wherein:

at least part of the mixture of withdrawn from the two-phase compression device the at least two sections is refrigerated and part of the mixture of fluids is recycled to the two-phase compression device.

20. A method as claimed in claim 19, wherein:
a flow rate of the solvent phase S is controlled as a function of the at least one fraction A to be separated.

21. A method as claimed in claim 20 wherein:
an aqueous phase is used as the solvent phase S.

22. A method as claimed in claim 20, wherein:
one of a rotating speed of the at least one two-phase compression device is controlled and/or an efficiency of a cooling device in the at least one two-phase compression device is controlled.

23. A method as claimed in claim 19 wherein:
the solvent phase is regenerated and recycled to an inlet of the at least one two-phase compression device.

24. A method as claimed in claim 19 wherein:
an aqueous phase is used as the solvent phase S.

25. A method as claimed in claim 19, wherein:
one of a rotating speed of the at least one two-phase compression device is controlled and/or an efficiency of a cooling device in the at least one two-phase compression device is controlled.

26. A method as claimed in claim 18, wherein:
a flow rate of the solvent phase S is controlled as a function of the at least one fraction A to be separated.

27. A method as claimed in claim 26 wherein:
an aqueous phase is used as the solvent phase S.

28. A method as claimed in claim 26, wherein:
one of a rotating speed of the at least one two-phase compression device is controlled and/or an efficiency of a cooling device in the at least one two-phase compression device is controlled.

29. A method as claimed in claim 18 wherein:
the solvent phase is regenerated and recycled to an inlet of the at least one two-phase compression device.

30. A method as claimed in claim 18 wherein:

an aqueous phase is used as the solvent phase S.

31. A method as claimed in claim 18, wherein:

one of a rotating speed of the at least one two-phase compression device is controlled and/or an efficiency of a cooling device in the at least one two-phase compression device is controlled.

32. A method as claimed in claim 10, wherein:

a flow rate of the solvent phase S is controlled as a function of the at least one fraction A to be separated.

33. A method as claimed in claim 32 wherein:

an aqueous phase is used as the solvent phase S.

34. A method as claimed in claim 32, wherein:

one of a rotating speed of the at least one two-phase compression device is controlled and/or an efficiency of a cooling device in the at least one two-phase compression device is controlled.

35. A method as claimed in claim 10 wherein:

the solvent phase is regenerated and recycled to an inlet of the at least one two-phase compression device.

36. A method as claimed in claim 10 wherein:

an aqueous phase is used as the liquid solvent phase S.

37. A method as claimed in claim 10, wherein:

one of a rotating speed of the at least one two-phase compression device is controlled and/or an efficiency of a cooling device in the at least one two-phase compression device is controlled.

\* \* \* \* \*